United States Patent [19]

Baylor

[11] Patent Number: 5,165,765
[45] Date of Patent: Nov. 24, 1992

[54] TRACK ADJUSTMENT VALVE

[75] Inventor: John M. Baylor, Rothschild, Wis.

[73] Assignee: Case Corporation, Racine, Wis.

[21] Appl. No.: 708,658

[22] Filed: May 31, 1991

[51] Int. Cl.⁵ .............................................. B62D 55/30
[52] U.S. Cl. ......................................... 305/10; 305/31
[58] Field of Search ....................... 305/10, 29, 30, 31, 305/32

[56]  References Cited

U.S. PATENT DOCUMENTS

| 2,837,380 | 6/1958 | Mazzarins | 305/10 |
| 3,101,977 | 8/1963 | Hyler et al. | 305/10 |
| 3,901,563 | 8/1975 | Day | 305/31 X |

FOREIGN PATENT DOCUMENTS 0155073  7/1986  Japan ...................................... 305/31

Primary Examiner—Russell D. Stormer
Attorney, Agent, or Firm—Jansson & Shupe, Ltd.

[57]  ABSTRACT

A valve assembly which is effective for filling a system with pressurized fluid and metering from the pressurized system a predetermined amount of pressurized fluid. The valve assembly includes a valve body comprising a primary chamber and a valve member adapted to move within the primary chamber. The primary chamber communicates with a source of pressurized fluid and also communicates with a working cylinder. The valve member is responsive to a first pressure of the source of pressurized fluid to allow the working cylinder to achieve a maximum stroke. The valve member is responsive to a second pressure of said pressurized fluid to meter a predetermined amount of fluid from the working cylinder before decoupling the working cylinder from the source of pressurized fluid. By metering a predetermined amount of fluid from the cylinder, the cylinder retracts to a position which is incrementally fixed in relation to its maximum stroke position. A system is also disclosed utilizing the valve in association with a track adjustment system for automatically adjusting the track tension on vehicles which employ ground engaging tracks.

11 Claims, 7 Drawing Sheets

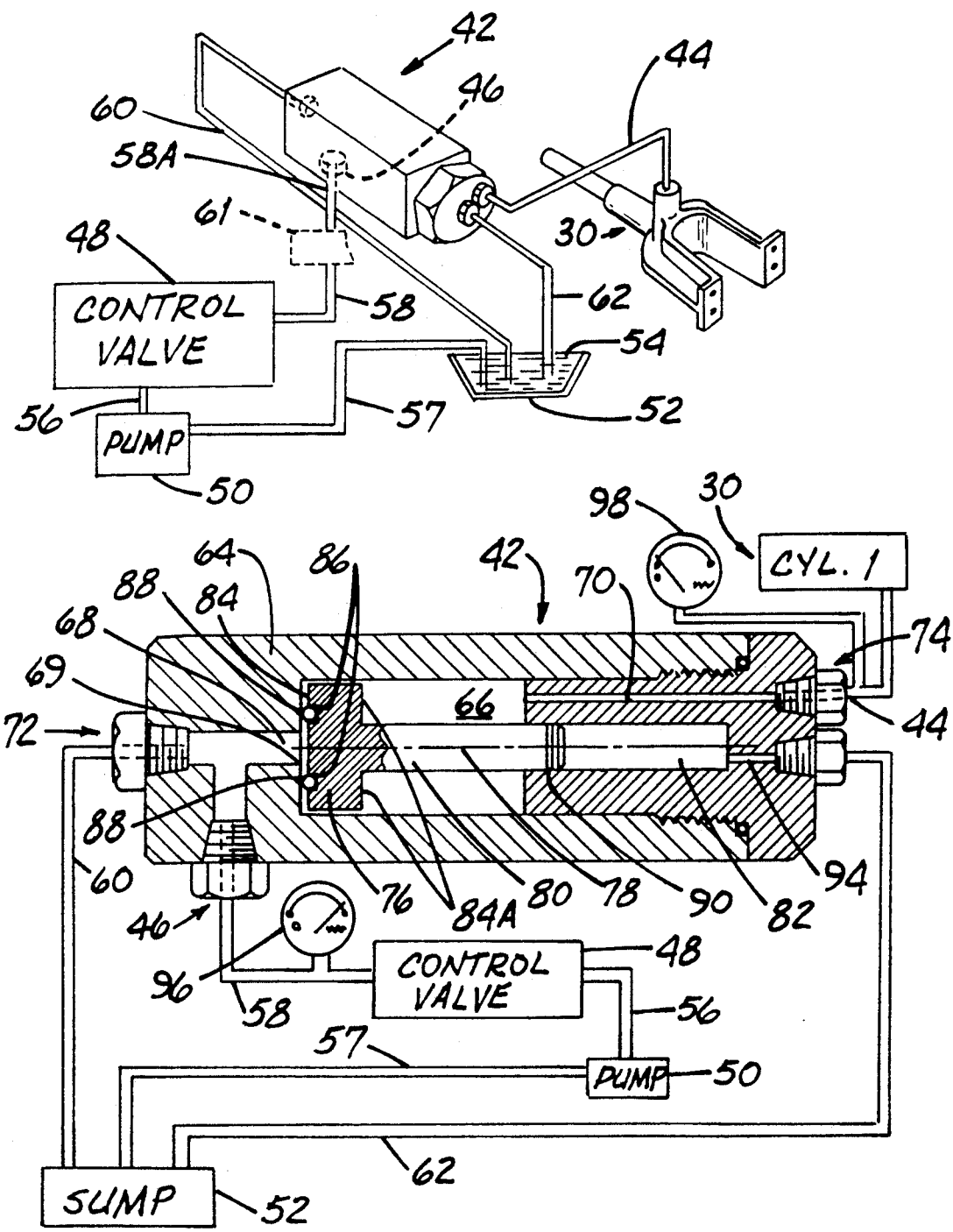

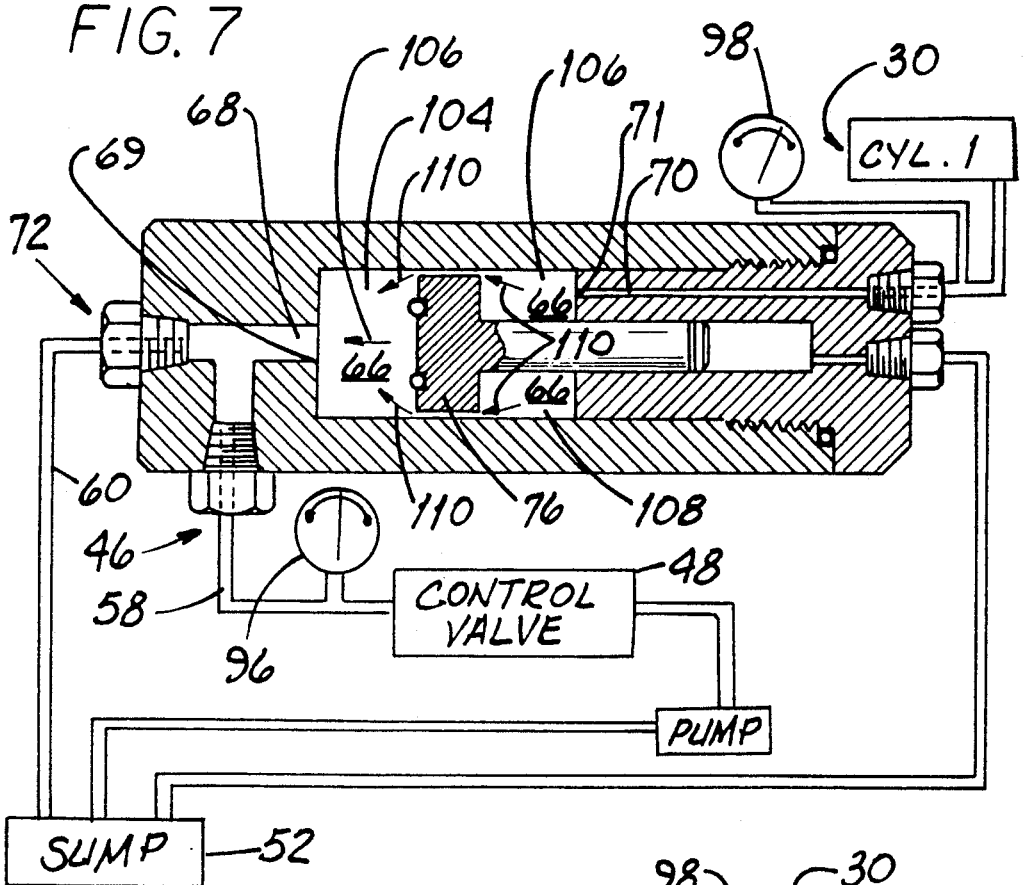
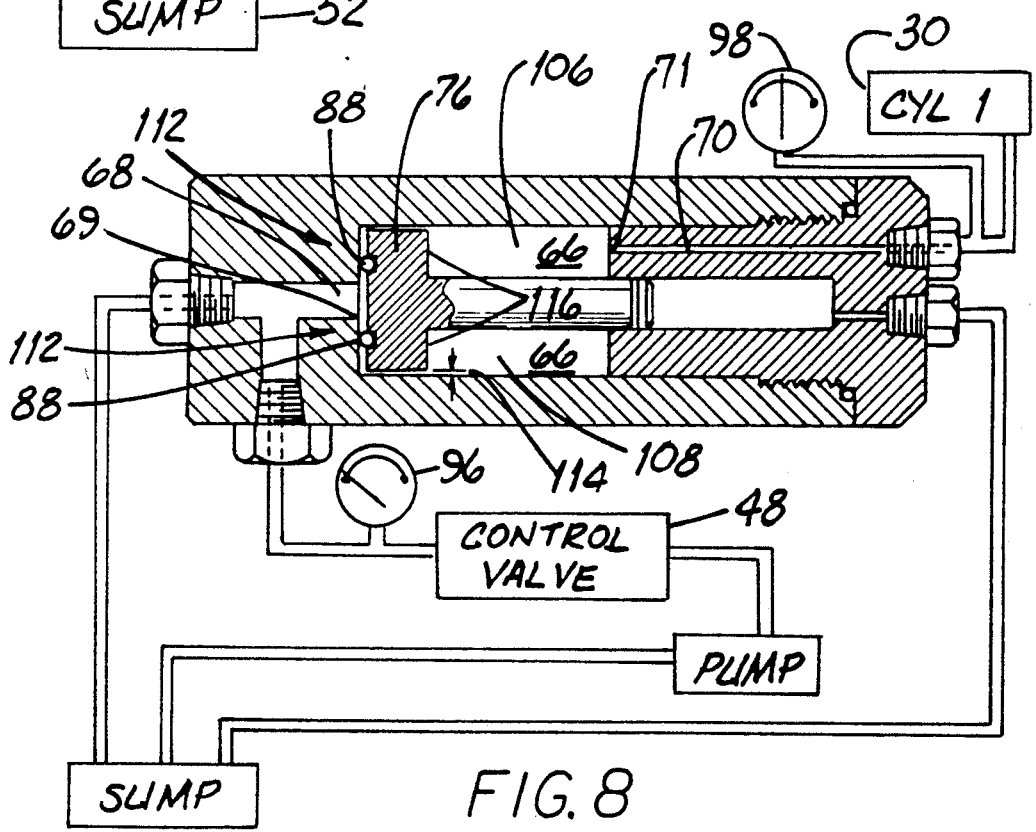

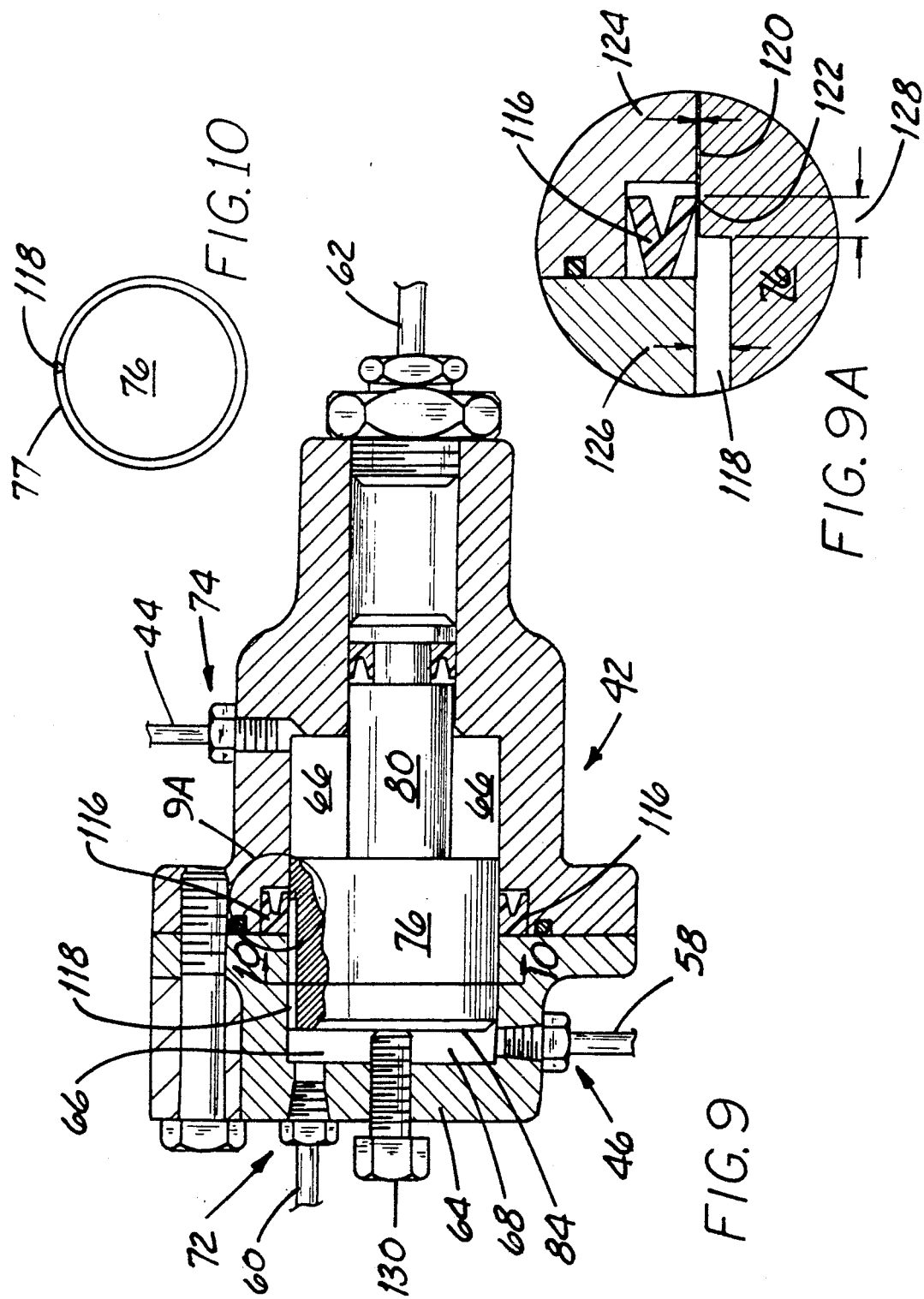

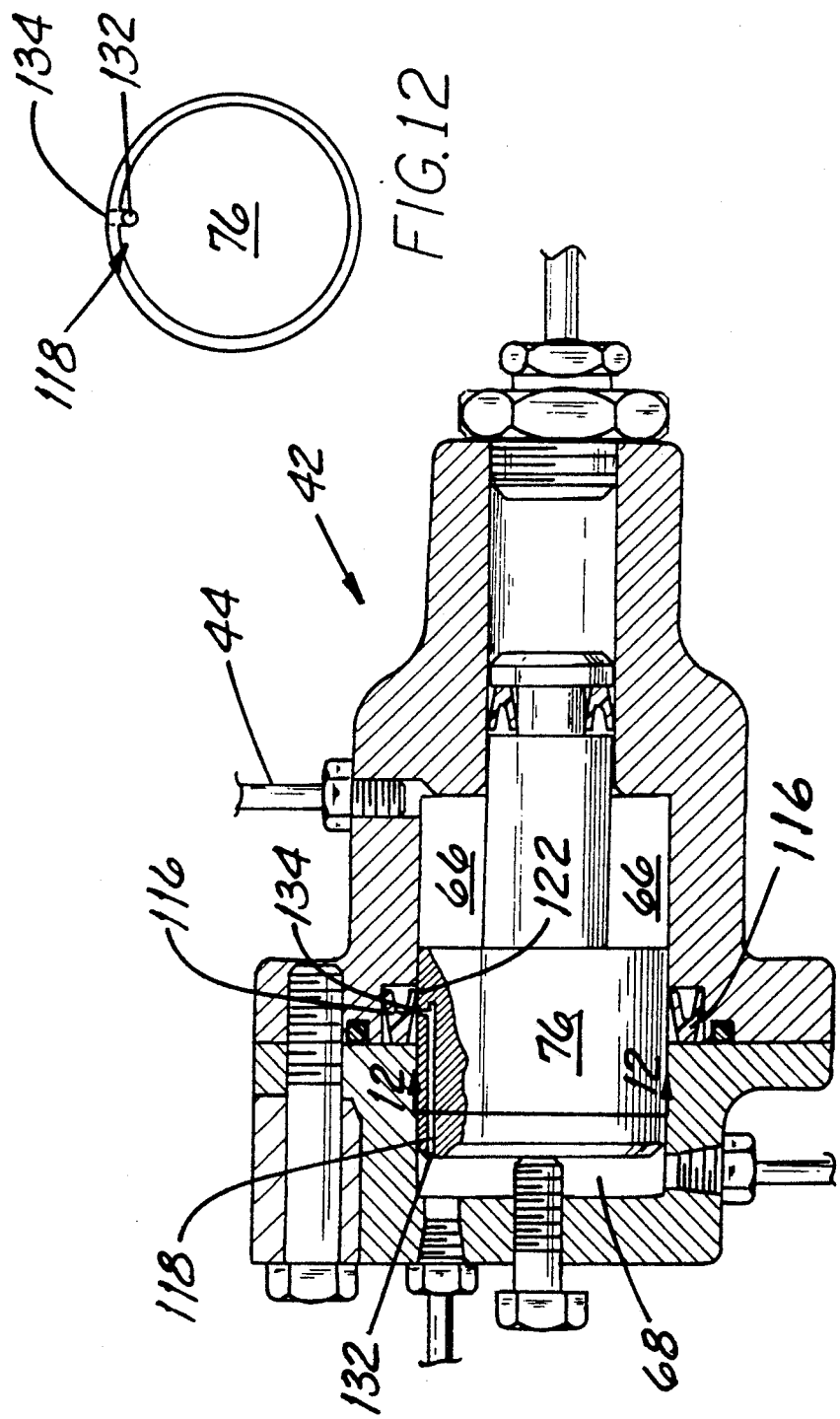

2

TRACK ADJUSTMENT VALVE

TECHNICAL FIELD

The present invention generally relates to hydraulic control systems, and more particularly relates to a hydraulic control system for automatically adjusting the tension on the track of agricultural, construction and like equipped vehicles.

BACKGROUND OF THE INVENTION

Many large vehicles such as agricultural tractors, construction equipment and the like employ one or more ground engaging tracks as a means for moving the vehicle. Vehicles of this type typically use two or more tracks, each track comprising a continuous loop which runs between a forward and rearward sprocket. Because the track provides a large ground engaging surface area, it has many advantages including providing excellent traction and maximum weight distribution. However, track systems are not without their drawbacks. For example, it is well known that for a track system to operate with maximum longevity and minimal maintenance, it must be operated under optimum tension. Excessive tension tends to accelerate the wear of the system components including the track, track sprockets and the like. On the other hand, insufficient tension provides unacceptable levels of play (or slop) between the track and the guide sprockets. If the tension is too low, the track could possibly come off the sprockets.

Because of the above advantages in maintaining the track at its optimum tension, many systems have been developed to adjust track tension. One well known method involves making one of the track sprockets adjustable in a way which enables tension to be applied to the track. In the past, mechanical systems have been used to adjust sprocket position. Such mechanical systems include connecting the axle of a sprocket to a movable housing which is attached to a mechanical extension means such as a jack screw, turn buckle or the like. As the mechanical extension means is manipulated manually, the sprocket can be moved thereby placing more or less tension on the track. Another commonly used method to adjust track tension is to replace the mechanical adjusting means with a grease cylinder. Under this type of system, when it is desired to adjust track tension, grease is pumped into the cylinder which extends a cylinder arm and positions the track sprocket to tighten the track. Under this type system if too much grease is pumped into the grease cylinder, a relief valve is provided for discharging grease from the cylinder. Although these prior art methods are somewhat effective, they suffer from severe drawbacks. For example, both of the above mentioned systems require a high degree of operator involvement. For example, they require the operator to check the tension in the system at a regular interval, and if the tension has deviated outside of the optimal range, the operator must take the necessary action to place the track tension within the optimum range. Under this type of arrangement, the operators are prone to forget to check track tension, or even when they do remember to check track tension, they must keep the proper tools with them to adjust the system should adjustment be required. Additionally, equipment of this nature is often operated in, or under, extremely undesirable conditions such as muddy or wet locations or sights which are exposed to outdoor elements. Under these conditions, it is undesirable to have the operator leave the cab to perform the track tensioning operation.

Thus, it is desirable to provide a track adjustment system which operates automatically without any substantial involvement from the vehicle operator.

Additionally, it is desirable for a track adjustment system to operate at regular intervals so that the track is maintained at optimal tension at all times. It is also desirable to have an automatic track adjustment system which is durable, comprises a minimal amount of components and is easy to service.

SUMMARY OF THE INVENTION

In light of the foregoing objects, one aspect of the present invention provides an automatic track adjustment system for use on vehicles of the type employing a track for engaging the ground and moving the vehicle. The track is normally of the type having a continuous loop structure which rotates about a first and second sprocket. The system generally comprises a tensioning means such as a hydraulic or pneumatic operated cylinder which is attached between the vehicle and the axle shaft of one of the sprockets. The tensioning means is responsive to a pressurized fluid for moving the sprocket to accomplish tensioning the track. The tensioning means is fluidly coupled to a track adjusting valve. The track adjusting valve is, in turn, fluidly coupled to a source of pressurized fluid. The track adjusting valve is responsive to a first pressure of the pressurized fluid from the pressure source, to couple the pressurized fluid into the tensioning means to accomplish tensioning the track to a maximum tension setting, and the track adjusting valve, is responsive to a second pressure of the pressurized fluid from the pressure source to fluidly uncouple the track adjusting means from the track adjusting valve after first removing a predetermined quantity of fluid from the tensioning means to accomplish positioning the track away from the maximum tension setting and placing it at an optimum tension setting.

In a second aspect, the present invention provides a valve assembly for use in metering a predetermined amount of pressurized fluid. The valve assembly is comprised of a valve body having a primary chamber and a first and second fluid passage communicating between the primary chamber and an outside surface of the valve body, the first fluid passage being coupled to a source of pressurized fluid, and the second passage being coupled to a working cylinder. A valve member is disposed within the primary chamber of the valve body and is adapted to move between a first and second position within the primary chamber in response to a pressure differential of the pressurized fluid across the first and second fluid passage. Means is provided for coupling the first fluid passage to the second fluid passage for filling and pressurizing the working cylinder and the same means is provided for decoupling the second fluid passage from the first fluid passage when the fluid pressure in the second fluid passage is at a higher pressure than the fluid in the first fluid passage. Before the decoupling takes place, however, a controlled amount of fluid is removed from the second fluid passage thereby removing a predetermined amount of fluid from the working cylinder. The coupling and decoupling means preferably includes a seal seated within an annular recess of the primary chamber and completely encircling and engaging an outer perimeter of the valve member.

The seal preferably has first and second opposing faces, the first face in uninterrupted communication with the first fluid passage and the second face in uninterrupted communication with the second fluid passage. The valve member preferably includes a metering passage communicating between a first and second surface of the valve member. The first surface of the valve member is in uninterrupted communication with the first fluid passage and the second surface of the valve member is in intermittent communication with the second fluid passage of the valve body. The second surface of the valve member is located such that when the valve member is in the first position within the primary chamber, the second surface of the valve member is proximal the first face of the seal thereby placing the second surface in communication with the first fluid passage, and when the valve member is in the second position within the primary chamber, the second surface of the valve member is proximal the second face of the seal thereby placing the second surface of the valve member in communication with the second fluid passage.

Other advantages and meritorious features of the present invention will become more fully understood from the following description of the preferred embodiments, the appended claims and drawings, a brief description of which follows.

BRIEF DESCRIPTION OF THE DRAWINGS

FIG. 3 is a diagrammatic view of the automatic track adjustment system of the present invention.

FIG. 4 is a diagrammatic view of the track adjustment system of the present invention showing a first embodiment of the track adjusting valve of the present invention having its valve member in the decoupled position.

FIG. 7 is a diagrammatic view of the track adjustment system of the present invention showing the first embodiment of the track adjustment valve of the present invention having its valve member in an intermediate coupled position.

FIG. 8 is a diagrammatic view of the track adjustment system of the present invention showing the first embodiment of the track adjusting valve of the present invention having its valve member in the decoupled position.

FIG. 9 is a cross-sectional view of a second embodiment of the track adjusting valve of the present invention.

FIG. 9A is an enlarged view of the area substantially encircled within the portion referenced as 9A in FIG. 9.

FIG. 10 is a front view of the valve member of the second embodiment of the track adjusting valve of the present invention taken substantially along lines 10—10 of FIG. 9.

FIG. 11 is a cross-sectional view of a third embodiment of the track adjusting valve of the present invention.

FIG. 12 is a front view of the valve member of the third embodiment of the track adjusting valve of the present invention taken substantially along lines 12—12 of FIG. 11.

DETAILED DESCRIPTION OF THE PREFERRED EMBODIMENTS

Figure 1:
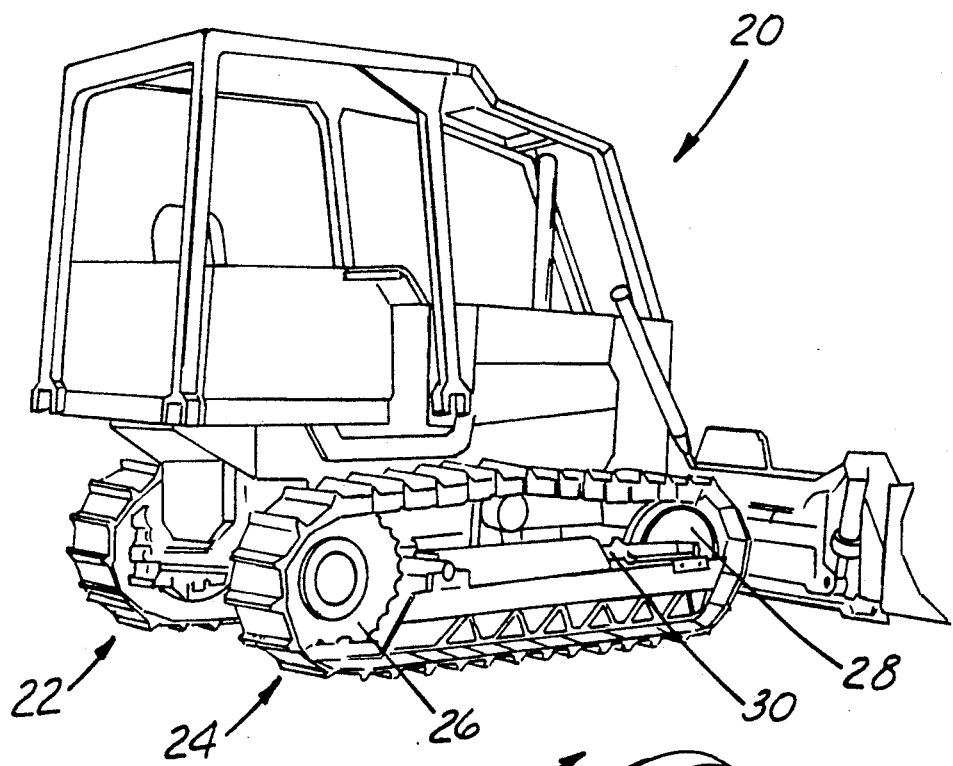
FIG. 1 is a perspective view of a vehicle employing a ground engaging track.

Now referring to FIG. 1, bull dozer 20 is shown having two ground engaging tracks 22, 24 for supporting and maneuvering bull dozer 20. Each ground engaging track 22, 24 continuously rotates between rear sprocket 26 and front sprocket 28. Front sprocket 28 is made movable away from, or toward rear sprocket 26 by way of working cylinder 30. For example, when working cylinder is extended, it pushes against the axle (axle not shown) of front sprocket 28 thereby causing front sprocket 28 to move away from rear sprocket 26 and accordingly tightening track 24. Likewise, when working cylinder 30 is retracted it urges sprocket 28 toward rear sprocket 26 thereby causing the distance between sprockets 26, 28 to decrease and accordingly, reducing the tension on ground engaging track 24. The detailed system which automatically allows working cylinder 30 to adjust the tension on ground engaging tracks 22, 24 will now be disclosed in detail; however, it is to be understood that even though the automatic track adjustment system of the present invention is disclosed in association with a bull dozer, it is within the scope of the disclosed system to be applied to any type of equipment such as agricultural, construction, industrial or the like which employs ground engaging tracks.

Figure 2:
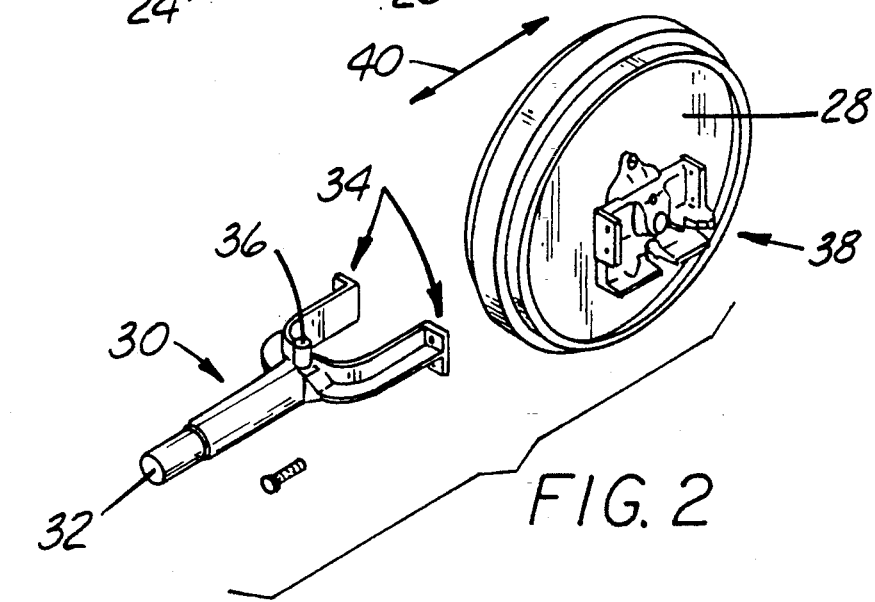
FIG. 2 is an isometric view of a working cylinder and a sprocket used in conjunction with a ground engaging track to adjust the tension thereof.

Now referring to FIGS. 1 and 2, working cylinder 30 includes first end 32, second end 34 and pressure port 36. First end 32 is adapted to engage the frame (frame not shown) of bull dozer 20 for supporting the reaction force of cylinder 30 as it applies tension against front sprocket 28. Second end 34 of working cylinder 30 is adapted to engage axle assembly 38 of front sprocket 28 to thereby urge front sprocket 28 away from or toward 40 rear sprocket 26. Working cylinder 30 is provided with pressure port 36 for receiving pressurized fluid. Cylinder 30 operates in the conventional manner in that once the pressurized fluid present at port 36 reaches a sufficiently high pressure, cylinder 30 pushes against and moves front sprocket 28 away from rear sprocket 26. Once fluid pressure is removed from port 36, cylinder 30 ceases applying pressure against axle assembly 38 and front sprocket 28 moves toward rear sprocket 26 thereby relieving tension from ground engaging track 24. The system of the present invention makes possible the automatic movement of cylinder 30 thereby accomplishing track tensioning without direct operator intervention. The manner in which this is accomplished will now be explained in conjunction with the subsequent drawings.

Now referring to FIG. 3, track adjustment valve 42 is fluidly connected to right-hand working cylinder 30. In a preferred embodiment, a separate track adjustment valve is required to operate each track. It is also preferred that the right and left hand track adjustment system use components which are interchangeable. Because the left hand track is adjusted in the identical manner to that of the right hand track, only the right hand track adjustment system is discussed in detail hereafter.

Pressure supply port 46 connects track adjustment valve 42 to control valve 48. Pump 50 is fluidly connected between control valve 48 and sump 52 thereby providing control valve 48 with a source of pressurized fluid. Sump 52 provides a collection and storage reservoir for all fluid which is returned from the system via lines 60, 62. It is important to note that the use of the term fluid throughout the specification is not limited to liquids but also includes the use of gas (such as compressed air or the like) as the medium used to operate cylinder 30.

Pump 50 is operative at all times the vehicle is in use thereby providing control valve 48 with a constant pressure head. Accordingly, whenever control valve 48 is activated, a momentary source of pressurized fluid is provided to coupling 58. After a predetermined period of time, a mechanism within control valve 48 would discontinue providing port 58 with a source of pressurized fluid. It is recognized that most control valves do not supply a temporal source of pressurized fluid, and accordingly, they would have to be modified in order to accomplish the momentary valving operation described above. Accordingly, if it is desired to use a standard control valve, and still effect the momentary application of fluid pressure to coupling 58, a manually operated on-off valve 61 could be placed in series with line 58. After control valve 48 is activated, line 58 would be constantly pressurized. Whenever it was desired to cycle track adjustment valve 42, the operator would simply activate manually operated valve 61 to an on position thereby pressurizing line 58A. After sufficient time had passed, valve 61 would be turned off thereby depressurizing line 58A. Of course the use of a modified control valve 48 as has been described above, or the use of a standard control valve 48 to conjunction with a manually operated on-off valve 61, does not effect the manner in which control valve 42 interacts with cylinder 30 to accomplish the track adjustment feature of the present invention. Accordingly, it is recognized that many different arrangements could be provided to provide valve 42 with a momentary source of pressurized fluid. Control valve 48 and manually operated valve 61 are merely discussed herein to illustrate two possible methods which could be used to provide valve 42 with its momentary source of pressurized fluid.

Drain lines 60, 62 serve to remove fluid from internal portions of valve 42, all of which will be more fully described in conjunction with the subsequent drawings. It is contemplated that control valve 48 will be activated at regular periods of time. This periodic activation can be achieved by several different methods. For example, control valve 48 can be activated whenever dozer 20 lift circuit is activated. Additional schemes might be used to activate control valve 48 whenever a button (button not shown) is manually pushed by the operator. Additional control logic can be added would determine the last time the control button was activated and if this time duration exceeds a predetermined amount the system could indicate to the vehicle operator that a track adjustment operation should be initiated the next convenient time.

The track adjustment method employed by the system of the present invention will now be described in connection with FIGS. 1, 2 and 3. Whenever it is deemed appropriate to adjust the tension of tracks 22, 24, control valve 48 is activated, in conjunction with one or more of the above-mentioned schemes thereby providing port 46 of valve 42 with pressurized fluid by way of fluid circuit path comprising sump 52, coupling 57, pump 50, coupling 56, control valve 48 and coupling 58. Valve 42 then communicates this pressure directly from port 46 to coupling 44 thereby causing cylinder 30 to apply maximum outward force on its sprocket thereby placing track 24 at a maximum tension setting. After this maximum tension setting is established, control valve 48 is deactivated thereby removing the source of pressurized fluid from port 46. Any pressurized fluid remaining in coupling 58 is allowed to drain into line 60 by way of internal passage 68 contained within valve 42. In addition to allowing pressurized fluid within coupling 58 to drain into line 60, valve 42 also provides a means for allowing a predetermined quantity of pressurized fluid residing in coupling 44 and cylinder 30 to drain into line 60 prior to decoupling pressurized fluid within coupling 44 and cylinder 30 from line 60 and coupling 58. By allowing a predetermined quantity of pressurized fluid to drain from cylinder 30 it is allowed to retract from its maximum tension setting and assume an optimum tension setting. Thus it can be easily seen, from the above-mentioned operation, that whenever control valve is activated and deactivated, cylinder 30 cycles to first assume a maximum tension setting and then backs off from the maximum tension setting and assumes an optimum tension setting. Accordingly, every time control valve is activated and deactivated the cab operator can automatically set the optimum tension of ground engaging tracks 22, 24 (assuming an identical system is in place to operate a left hand working cylinder). Thus it can be seen that the system of the present invention eliminates the drawbacks of presently known mechanical and hydraulic operations wherein the track tension is manually adjusted. The structure within valve 42 which allows it to operate in the above described manner will now be explained fully in conjunction with the remaining drawings.

Now referring to FIG. 4, valve 42 is comprised of valve body 64 which has primary chamber 66 disposed therein. Fluid passage 68 communicates between primary chamber 66 and drain port 72. Fluid passage 70 communicates between primary chamber 66 and cylinder supply port 74. Fluid passage 68 also communicates with pressurize supply port 46. Valve member 76 is disposed within primary chamber 66. Preferably, both primary chamber 66 and valve member 76 are cylindrical in shape and are respectively sized so that valve member 76 freely moves along central axis 78. Valve member 76 preferably includes stem portion 80 which is adapted to be received, and freely moved along central axis 78 within stem chamber 82. Stem 80 primarily functions to keep valve member 76 properly oriented within primary chamber 66 thereby preventing it from cocking. In addition to keeping valve member 76 properly oriented within primary chamber 66, stem 80 also functions to provide a different surface area between face 84 and 84A of valve member 76. Because of this differential surface area across valve member 76, even when the fluid pressure within passage 68 is approximately equal to the fluid pressure within passage 70, valve 76 will still move away from fluid passage 68 and towards fluid passage 70. Thus, it can be seen, that even when cylinder 1 is filled with a pressurized fluid, the introduction of a fluid of substantially equal pressure at passage 68 will cause valve member 76 to move away from opening 69 of fluid passage 68.

Valve member 76 includes face 84 which is proximal passage 68. Face 84 is fitted with annular groove 86 which completely encircles opening 69 of fluid passage 68 and is adapted to receive annular seal 88. Annular seal 88 is preferably bonded to groove 86 to prevent it from being dislodged therefrom. Stem 80 is preferably fitted wi(h seal 90 to prevent substantial fluid leakage between primary chamber 66 and stem chamber 82. Should any fluid reach chamber 8Z, it is relieved therefrom via passage 94 which communicates with drain line 62. The operation of valve 42 in conjunction with other system components will now be described, particularly as it relates to the operation of valve 42 to accomplish the automatic track adjusting feature of the present invention.

When it is desired to automatically adjust the tension of vehicle tracks 22, 24 control valve 48 is activated in accordance with one of the aforementioned schemes. When control valve 48 is activated, coupling 58 is pressurized to a maximum pressure level (maximum pressure level indicated by reading on pressure gauge 96). The pressurizing of coupling 58 will fill passage 68 of valve 42 and begin to exert pressure on face 84 of valve member 76. This pressure on face 84 of valve member 76 will begin to displace valve 66 along axis 78.

Figure 5:
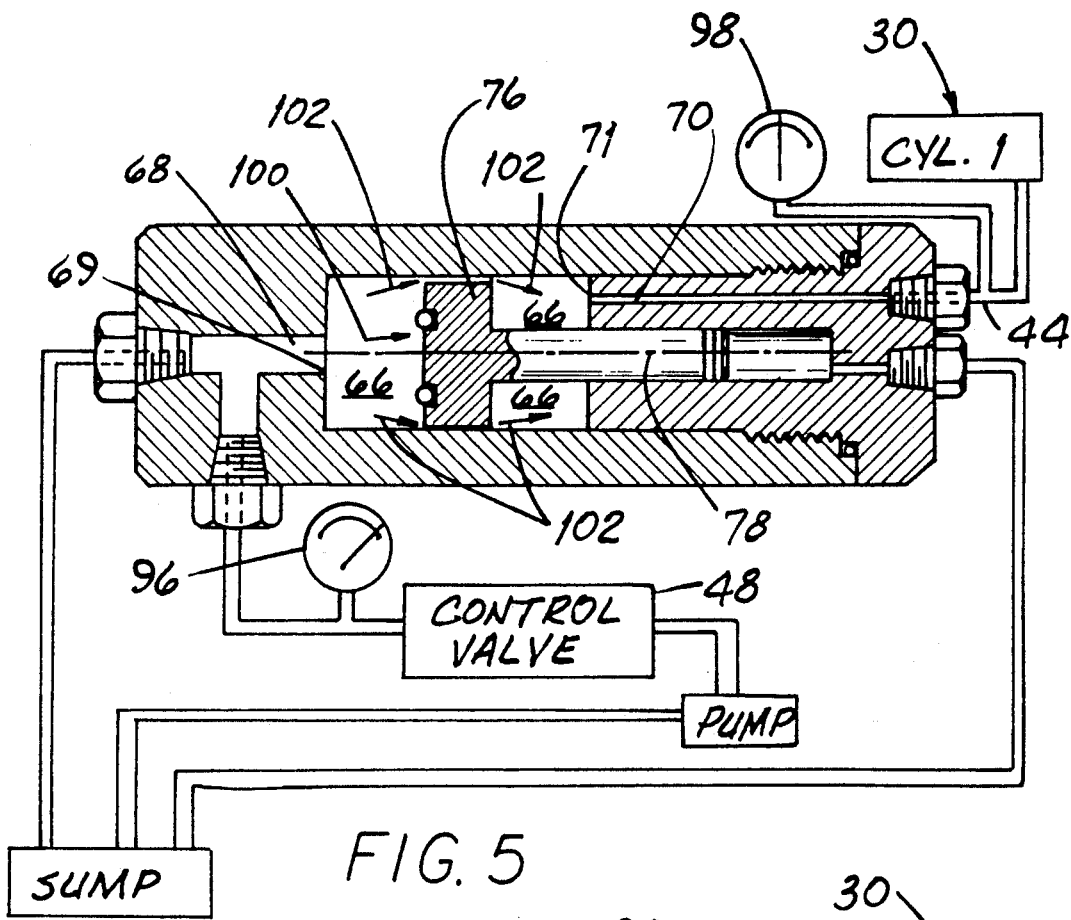
FIG. 5 is a diagrammatic view of the track adjustment system of the present invention showing the first embodiment of the track adjustment valve of the present invention having its valve member in an intermediate coupled position.

Now referring to FIG. 5, as fluid pressure displaces valve 76 along 78, valve 76 moves (movement shown at 100) toward opening 71 of passage 70 and away from opening 69 of passage 68. Once this movement begins, pressurized fluid enters primary chamber 66 continuing to act on valve member 76, but also flowing between the outside surface of valve 76 and the inside surface of primary chamber 66 (this flow shown at 102). As this flow continues, fluid flows through passage 70, coupling 44 and into cylinder 30. This flow into cylinder 30, begins to pressurize them as shown by the intermediate position of the needle on pressure gauge 98.

Figure 6:
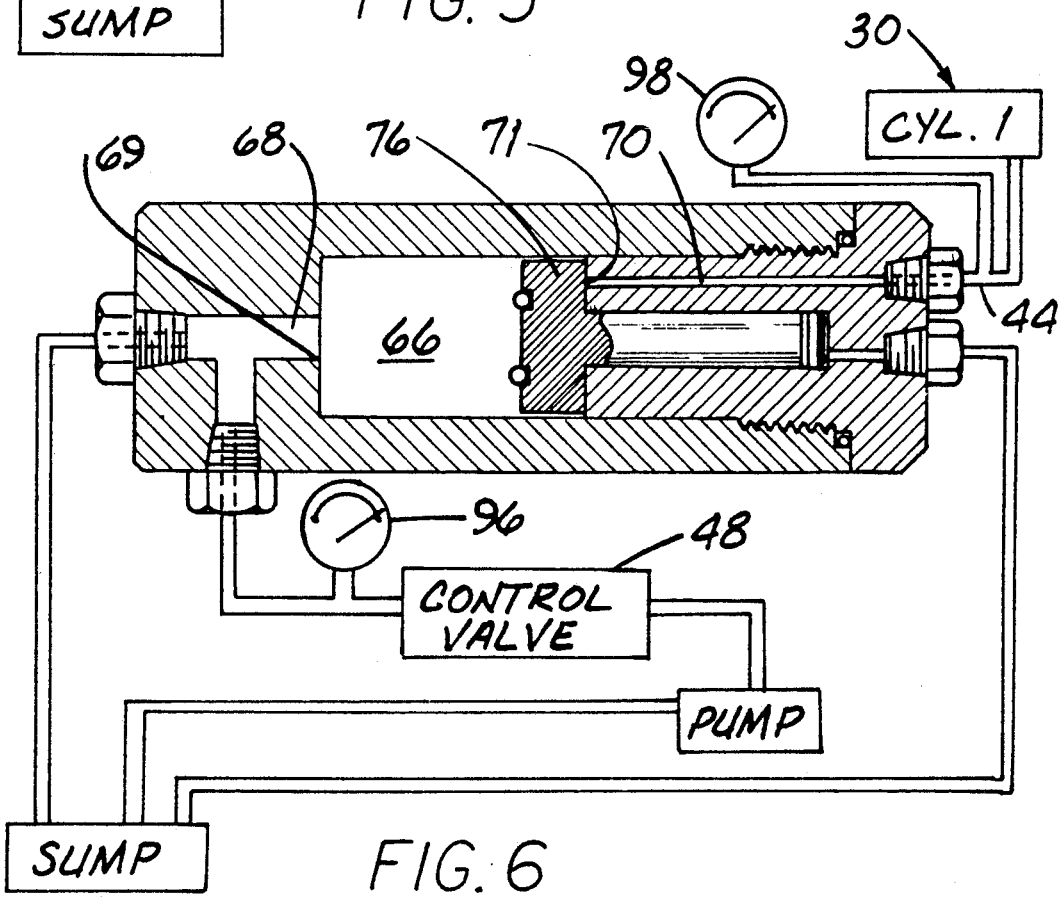
FIG. 6 is a diagrammatic view of the track adjustment system of the present invention showing the first embodiment of the track adjusting valve of the present invention having its valve member in the fully coupled position.

Now referring to FIG. 6, after some period of time after control valve 48 has been activated the system will achieve the static position shown in FIG. 6. Namely, valve 76 will have moved as far as possible from opening 69 of fluid passage 68. Additionally, working cylinder 30 will have been exposed to pressurized fluid for a sufficient duration of time to assume a maximum extended position thereby applying maximum tension to track 24. After a sufficient duration of time has elapsed after activating control valve 48 to achieve the system status depicted in FIG. 6, control valve 48 is deactivated and the manner in which the system responds is now discussed in conjunction with FIG. 7.

After control valve 48 has been deactivated, pressurized fluid contained within coupling to and fluid passage 68 will begin to drain into sump 52 by way of drain line 60. Once this begins, pressure within passage 68 drops below that pressure within passage 70 thereby creating a pressure differential across valve member 76. This pressured differential across valve member 76 causes it to move 106 toward opening 69 of passage 68. As valve 76 moves, fluid from cylinder 30 flows out therefrom and into voids 106, 108 of primary chamber 66. Because of the gap between valve 76 and the walls of primary chamber 66, some fluid will flow from voids 106, 108 around valve member 76 and into passage 68 (this flow indicated by 110).

After control valve 48 has been deactivated, and sufficient time has lapsed, the system will achieve the final "resting" disposition as depicted in FIG. 8. Residual pressure 98 within cylinder 30 will force valve member 76 toward opening 69 of passage 68. This force will push annular seal 88 of valve 76 against a surface 112 of primary chamber 66 which encircles opening 69 of fluid passage 68. This forcing action will cause valve 76 to seal passage 68 from fluid passage 70 thereby preventing any further fluid from leaving cylinders 30, 31. Thus, it can be seen, that cylinder 30 is retracted from its maximum tension setting by an amount which is proportional to the quantity of fluid stored in voids 106, 108 plus the quantity of fluid 110 which flows between valve member 76 and the wall of primary chamber 66 during the time it takes valve 76 to travel from its position shown in FIG. 6 to its final "resting" position shown in FIG. 8. Accordingly, by engineering the size f gap 114, the size of voids 106, 108 and knowing the volume of fluids stored within passage 70, coupling 44 and cylinder 30, the amount of travel of cylinder 30 (between maximum tension setting and optimum tension setting) can be easily engineered. Thus, the disclosed system and valve is operative to accomplish setting track 24 at its optimal tension setting.

It is important to note that while the foregoing explanation of FIGS. 4-8 was conducted under the assumption that no fluid was present in primary chamber 66, passage 70, coupling 44 and cylinder 30, the operation of the system does not change when the components are initially filled with fluid. Specifically, valve member 76 will always be displaced away from fluid passage 68 within primary chamber 66 whenever control valve 48 is opened. This is true even when the pressure in fluid passage 70 is equal to the pressure within fluid passage 68. This is so because the surface area of face 84 of valve member 76 is greater than the surface area of opposing face 116 of valve member 76. Because this is true, valve 76 will always begin at the rightmost position upon deactivation of control valve 48 and travel a fixed distance (from the rightmost extreme position shown in FIG. 6 to the leftmost extreme position shown in FIG. 8) and accordingly cylinder 30 will always assume a retracted position which is incrementally less than the maximum tension setting and thus, in a properly designed system, the incremental retraction of cylinder 30 will place track 24 in its optimum tension setting.

Now referring to FIG. 9, a second embodiment of valve 42 is shown. Valve 42 is identical, in all respects, to valve 40 to herefore described in conjunction with FIGS. 3-8 with the primary exception that gap 114 no longer exists and is closed up by virtue of seal 116. Instead of relying on gap 114 to relieve fluid from cylinder 30, it is believed that by fitting valve member 76 with open channel 118 along one of its surfaces, greater control can be achieved in metering the fluid during the time in which valve 76 moves from its rightmost position within primary chamber 66 to its leftmost "resting" position within primary chamber 66. The operation of second embodiment of valve 42 to accomplish the improved metering is now explained in conjunction with FIGS. 9 and 9A.

When valve 76 is in its leftmost position within primary chamber 66, seal 116 engages side wall surface 120 of valve member 76 at portion 122. This engagement at portion 122 is sufficient to block any communication of fluid through gap 124. Thus it can be seen that when valve 76 is in its leftmost "rest" position, it prevents any transfer of fluid from coupling 44 to fluid passage 68, and accordingly, operates identically to that of the first embodiment of valve 42 as disclosed in conjunction with FIGS. 4-8. When passage 68 is pressurized, as has heretofore been explained, valve member 76 begins to move from its leftmost position toward its rightmost position. At some point during the course of this movement, channel 118 is brought under portion 122 of seal 116. Channel 118 thereby introduces gap 126 which is much too wide for seal 116 to expand across thereby allowing pressurized fluid to communicate from fluid passage 68 to coupling 44.

After cylinder 30 has been fully pressurized and control valve 48 is deactivated, valve member 76 moves from its rightmost position toward its leftmost "resting" position. During the initial instant of the leftward travel of valve 76, channel 118 allows fluid to escape around seal 116 as has heretofore been explained. However, during the final stages of its leftward travel (indicated at 128) channel 118 is no longer proximate seal 116 and gap 124 is sealed. Thus, the movement of valve member 76 within primary chamber 66 and the cooperation of open channel 118 and seal 116 affect the controlled draining of fluid from cylinder 30 in a similar manner to that of the first embodiment of valve 42.

Now referring to FIG. 10, open channel 118 is shown running along a surface 77 of valve member 76.

One additional manner in which the second embodiment of valve 42 differs from the first embodiment of valve 42 is that in FIG. 9, bolt 32 is threaded through valve body 64 and adapted to engage face 84 of valve member 76. By rotating bolt 130, the final leftmost "resting" position of valve 76 can be adjusted. This allows for the system to be recalibrated should it be necessary. One possible reason recalibration may be necessary is if replacement components are installed which do not hold the same volume of fluid as the components they replaced.

Now referring to FIG. 11, a third embodiment of valve 42 is disclosed. The third embodiment of valve 42 is identical, in all ways to the second embodiment of valve 42 disclosed in conjunction with FIGS. 9, 9A and 10 except for the nature in which channel 118 is constructed. Channel 118 in FIG. 11 is a closed channel, unlike the open channel construction of the second embodiment disclosed in FIG. 9. Accordingly, channel 118 of the third embodiment is completely enclosed within the core of valve member 76 except for a first channel opening 132 and a second channel opening 134. The first channel opening 132 is in constant communication with fluid passage 68 irrespective of the position of valve member 76 within primary chamber 66. Second channel opening 134, however, is in intermittent communication with fluid passage 68 and coupling 44 depending upon position of valve member 76 within primary chamber 66. For example, when valve 76 is disposed in its leftmost position within primary chamber 66 second channel opening 134 is in communication with fluid passage 68. Accordingly, seal 116 effectively decouples fluid passage 68 from coupling 44. When valve member 76 moves from its leftmost position toward its rightmost position, at some point during the course of its travel, second channel opening 134 crosses point 122 thereby placing fluid passage 68 in fluid communication with coupling 44. Thus, the third embodiment of valve 42 operates identically to that of the second embodiment of valve 42 disclosed in conjunction with FIGS. 9, 9A and 10. It is believed, however, that the third embodiment of valve 42 is superior to the second embodiment of valve 42 inasmuch as the second embodiment has a tendency to quickly wear or deform the sealing edges of seal 116 because of the direct engagement between seal 116 and open channel 118. Over time, this may affect the ability of seal 116 to effectively seal fluid flow between fluid passage 68 and coupling 44. However, enclosed channel 118, as set out in conjunction with FIG. 11, is believed to interfere less with the sealing ability of seal 116 thereby promoting longevity of life.

Referring to FIG. 12, valve member 76 includes enclosed channel 118 having first opening 132 and second opening 134.

Figure 13:
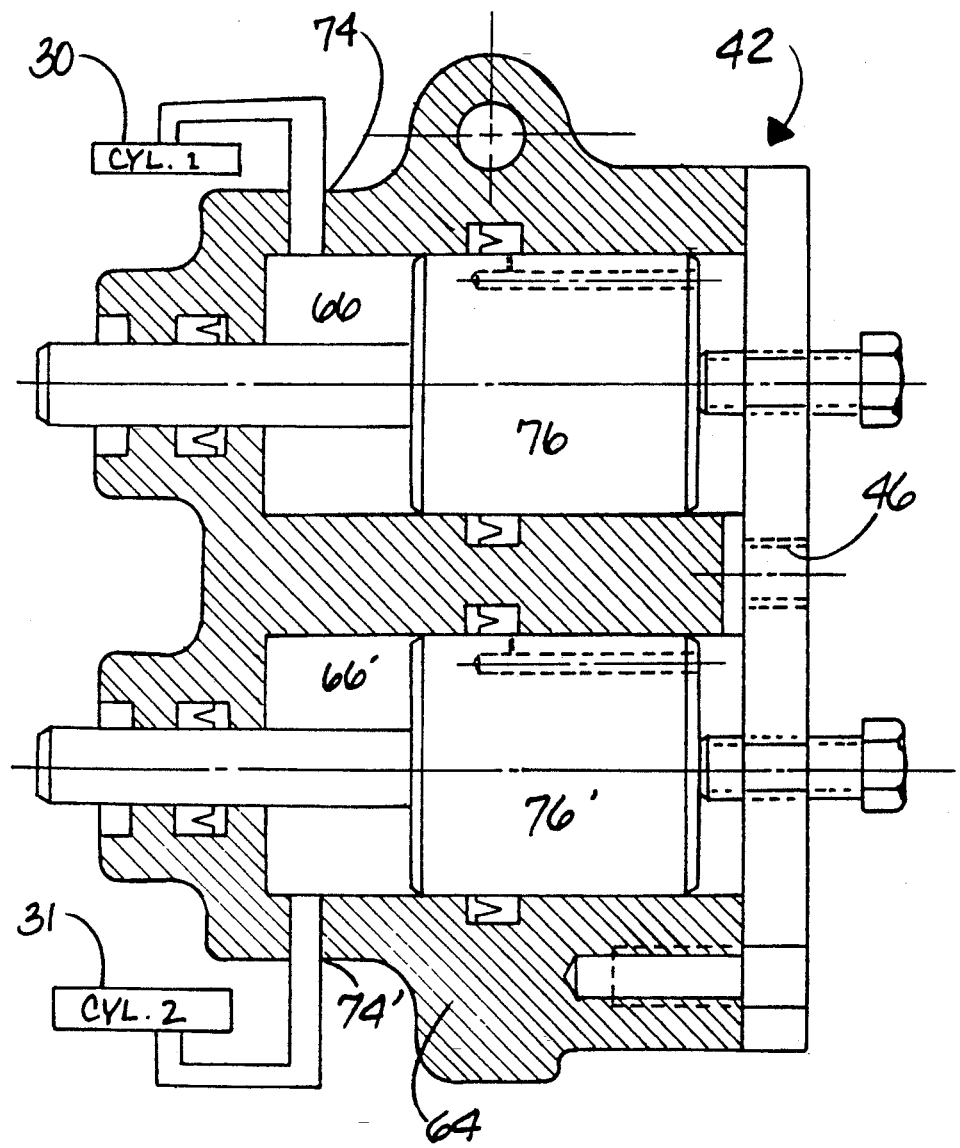
FIG. 13 is a cross-sectional view of a fourth embodiment of the track adjusting valve of the present invention.

Now referring to two FIGS. 3 and 13, as was mentioned in conjunction with FIG. 3, in its preferred embodiment, both the right and left working cylinders 30, 31 (left hand working cylinder 31 not shown in FIG. 3) are preferably operated by respectively associated track adjustment valves 42, 43 (left hand track adjustment valve 43 not shown in FIG. 3). Although it is the preferred mode to have separate valves 42, 43 and embodiment of the track adjustment valve of the present invention, as set out in FIG. 13, includes both right hand and left hand valve members 76, 76' mounted within a common valve body 64. Pressure supply port 46 provides a means for supplying pressurized fluid to primary chambers 66, 66'. Right hand cylinder 30 communicates with output port 74, likewise left hand cylinder 31 communicates with output port 74'. In view of the foregoing discussion of the various valve embodiments, it is easily seen that the embodiment set out in FIG. 13 accomplishes independent tensioning of both right and left tracks by incorporating two independent valve members, 76, 76' within a unitary valve body 64.

While the foregoing description of the invention has been made with respect to preferred embodiments, persons skilled in the art will understand, in light of the present disclosure, that numerous changes, modifications and alterations may be made therein without departing from the spirit and the scope of the appended claims. For example, it is contemplated that any type of vehicle which employs tracks for engaging the ground beneath the vehicle may enjoy the system disclosed herein. Moreover, it is understood that many different materials may be employed to construct the disclosed valve and its component parts including cast metal, plastic, and the like. Therefore, all such changes, modifications and alterations are deemed to be within the scope of the invention as defined in the following claims.

I claim:

1. A valve assembly for use in filling a system with pressurized fluid and metering from the system a predetermined amount of pressurized fluid, said valve assembly comprising:

a valve body having a primary chamber and a first and second fluid passage communicating between said primary chamber and an outside surface of said valve body, said first fluid passage being coupled to a source of said pressurized fluid, said second passage being coupled to a working cylinder, a valve member disposed within said primary chamber and adapted to move between a first and second position within the primary chamber in response to a force differential of said pressurized fluid across said first and second fluid passage, means associated with said valve body and said valve member for, coupling said first fluid passage to said second fluid passage when said fluid in said first fluid passage exerts a greater force against a first surface of said valve member than that exerted against a second surface of said valve member by said fluid in said second passage, decoupling said second fluid passage from said first fluid passage when said fluid in said second fluid passage exerts a greater force against said second surface of said valve member than that exerted against said first surface of said valve member by said fluid in said first fluid passage, wherein said means permits the transfer of a controlled amount of said fluid from said second fluid passage to said first fluid passage before decoupling said second passage from said first passage, thereby allowing a predetermined quantity of fluid to be removed from said working cylinder prior to decoupling said working cylinder from said source of pressurized fluid.

2. The valve assembly of claim 1, wherein said valve member is a generally cylindrically shaped piston adapted to move within said primary chamber.

3. The valve assembly of claim 2, wherein said valve member is adapted to move linearly within said primary chamber.

4. The valve assembly of claim 1, wherein said coupling and decoupling means includes a seal seated within an annular recess of said primary chamber and completely encircling and engaging an outer perimeter of said valve member, said seal having first and second opposing faces, said first face in uninterrupted communication with said first fluid passage and said second face in uninterrupted communication with said second fluid passage, and wherein said valve member includes a metering passage communicating between a first and second surface of said valve member, said first surface in uninterrupted communication with said first fluid passage of said valve body and said second surface in intermittent communication with said second fluid passage of the valve body, wherein said second surface of said valve member is located such that when said valve member is in said first position within the primary chamber, said second surface of said valve member is proximal said first face of said seal thereby placing said second surface in communication with said first fluid passage, and when said valve member is in said second position within the primary chamber, said second surface of said valve member is proximal said second face of said seal thereby placing said second surface of said valve member in communication with said second fluid passage.

5. The valve assembly of claim 4, wherein said metering passage includes an open channel disposed along a surface portion of said valve member.

6. The valve assembly of claim 4, wherein said metering passage includes an enclosed channel, said channel completely encircled by said valve member said channel having first and second openings terminating at said first and second surfaces of said valve member.

7. The valve assembly of claim 1, wherein said coupling and decoupling means includes a seal disposed within an annular recess formed in a surface portion of said valve member, said seal adapted to engage and seal a surface of said primary chamber when said valve member is in said first position thereby decoupling said second fluid passage from said first fluid passage, and wherein said coupling and decoupling means further includes a gap between an outer surface of said valve member and an inner surface of said primary chamber, said gap allowing fluid communication between said first and second fluid passage when said valve member is in said second position.

8. An automatic track adjustment system, for use on vehicles of the type employing a track for engaging the ground and moving the vehicle, said track having a continuous loop structure which rotates about a first and second sprocket, said system comprising:

tensioning means attached between said vehicle and a first one of said sprockets, said tensioning means responsive to a pressurized fluid for moving said first sprocket to accomplish tensioning said track, track adjusting valve, fluidly coupled between said tensioning means and a source of pressurized fluid, said track adjusting valve responsive to a first pressure of said pressurized fluid from said pressure source, to couple said pressurized fluid into said tensioning means to accomplish tensioning said track to a maximum tension setting, and said track adjusting valve, responsive to a second pressure of said pressurized fluid from the pressure source, to fluidly uncouple said track adjusting means from said track adjusting valve after first removing a predetermined quantity of fluid from said tensioning means to accomplish tensioning said track away from said maximum tension setting to a optimum tension setting.

9. The automatic track adjustment system of claim 8, wherein said fluid is a generally noncompressable liquid.

10. The automatic track adjustment system of claim 8, wherein said fluid is a gas.

11. The automatic track adjustment system of claim 8, further comprising a control valve fluidly coupled between said track adjusting valve and said source of pressurized fluid.

* * * * *